United States Patent
Wu et al.

(10) Patent No.: US 7,377,694 B2
(45) Date of Patent: May 27, 2008

(54) ROLLER CONNECTING AND RETAINING DEVICE

(75) Inventors: Chun-Liang Wu, Taichung (TW); En-Chieh Chen, Taichung (TW)

(73) Assignee: Hiwin Technologies Corp., TAichung (TW)

( * ) Notice: Subject to any disclaimer, the term of this patent is extended or adjusted under 35 U.S.C. 154(b) by 293 days.

(21) Appl. No.: 11/307,866

(22) Filed: Feb. 26, 2006

(65) Prior Publication Data

US 2007/0201777 A1 Aug. 30, 2007

(51) Int. Cl.
*F16C 29/06* (2006.01)

(52) U.S. Cl. .......................................... 384/51; 384/44

(58) Field of Classification Search ............ 384/43–45, 384/51
See application file for complete search history.

(56) References Cited

U.S. PATENT DOCUMENTS 6,390,678 B1 * 5/2002 Shirai .......................... 384/44
6,626,572 B2 * 9/2003 Teramachi ................... 384/44
7,134,789 B2 * 11/2006 Nagao et al. ................. 384/44
2004/0184685 A1 * 9/2004 Michioka et al. ............. 384/44

* cited by examiner

*Primary Examiner*—Thomas R Hannon
(74) *Attorney, Agent, or Firm*—Banger Shia (57) ABSTRACT

A roller connecting and retaining device comprises two connecting portions, a plurality of retaining portions and spacer portions. The retaining portions are oppositely arranged in pairs and connected vertically to the connecting portions. The spacer portions are connected between the upper end and the lower end of the paired opposite retaining portions. Two contacting edges are formed at both sides of the respective spacer portions and have a linear contact with the rolling surface of the rollers, and the contacting edges of the opposite spacer portions are located correspondingly to the axial center of the rollers and are arranged at both sides of the inactive contact surface of the rollers. A mold-releasing concave is formed in each conjunction between the spacer portion and the retaining portion. Such design facilitates injection molding process, mold opening, and mass production. The contacting edge of the opposite spacer portions can prevent the problems of the rollers during rolling motion, such as slant position, friction, impact and skip.

5 Claims, 6 Drawing Sheets

ROLLER CONNECTING AND RETAINING DEVICE

BACKGROUND OF THE INVENTION

1. Field of the Invention

The present invention relates to a connecting and retaining device for a linear mechanism using rollers as rolling elements, wherein the special design of the spacer portion is suitable for integral formation and fast mass production, and can prevent skew position, friction and impact of the rollers, ensuring a stable transmission.

2. Description of the Prior Art

Since linear transmission products are being applied more and more widely in the modern industry, various linear transmission mechanisms have widely come into human life, manufacturing factory and high science and technology instruments, such as linear guideway, ball screw, and the like. Particularly in a large-scale precision mechanism are usually installed various large and small ball screws or linear guideway systems. Although the technology for linear transmission element is developing fast, consumers still need the technology to be improved uninterruptedly. Therefore, there are still some problems to be solved. And this desire for constant improvement of technology is particular strong in many high precision mechanism-manufacturing fields (such as wafer process equipment, CNC equipment, etc) that require comparative stability and quiet. Hence, the existing linear mechanism still has some technological blind spots to be improved.

Figure 1:
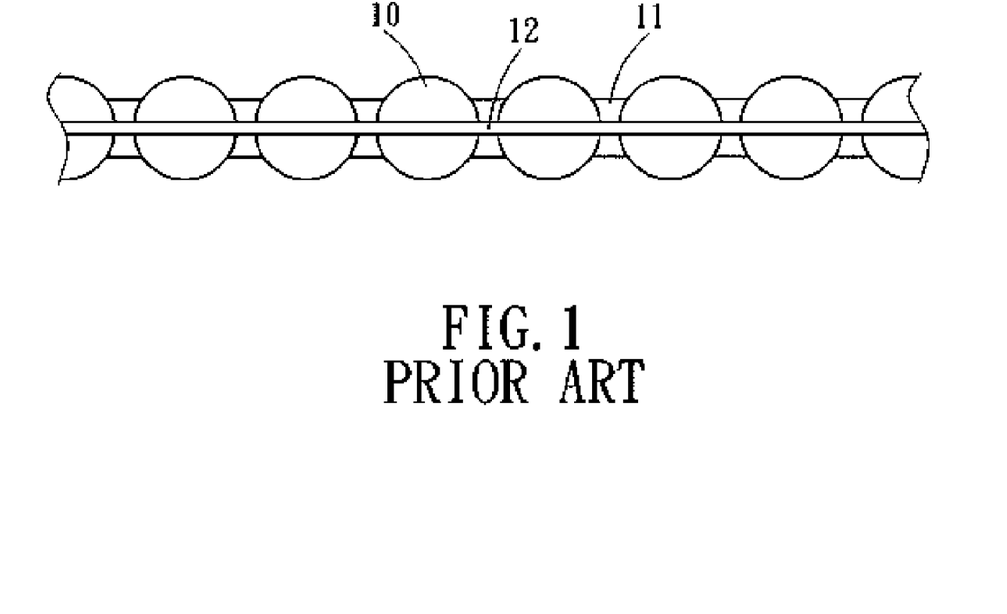
FIG. 1 is a side view of a conventional roller connecting and retaining device.

The designs of the existing roller spacer of a linear guideway currently on the market generally include the following three types:

A. a first conventional roller spacer as shown in FIG. 1, in which, a chain 12 is connected at either end surface to the respective rollers 10, and the spacer portion 11 of the chain 12 is made by using the rollers 10 as a core of the mold. The rollers 10 are initially placed in the male and the female molds, and then the plastic is injected along the surface of the rollers 10. This type roller spacer has the following disadvantages (U.S. Pat. No. 6,626,572 B2):

1, the spacer portion 11 of the chain 12 is formed directly between the rollers 10 by using the rollers 12 as mold core, the related production technology is very complicated. Furthermore, the size of the mold has to change according to different sizes. When the chain 12 is comparatively long, the number of to-be-implanted rollers 10 will be relative large, the production time will be long and production complexity will be increased, and the resultant technical cost will be relatively high.

2, the spacer portion 11 of the chain 12 is formed directly between the rollers 10 by using the rollers 10 as mold core, it must apply release agent between the spacer portion 11 and the rollers 10 prior to the formation of the spacer portion 11, this also makes the production process more complicated and increases the production cost.

3, the spacer portion 11 of the chain 12 is formed with two concave side surfaces for mating with the rollers 10, and the concave side surfaces of the spacer portion 11 has the same radius of curvature as the rollers 10. As a result, the spacer portion 11 comes into a surface contact with the rollers 10, substantially increasing the friction resistance between the rollers and the spacer portion.

Figure 2:
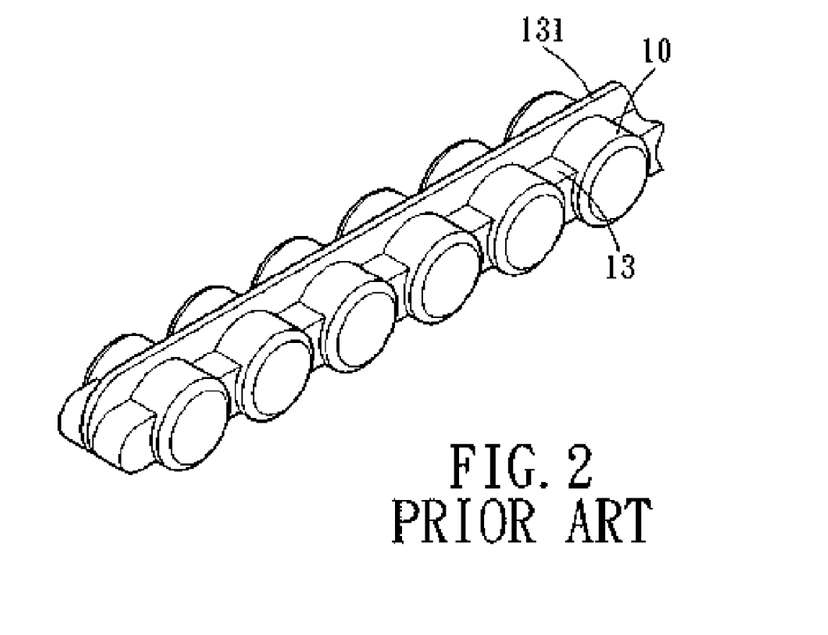
FIG. 2 is a perspective view of a second conventional roller connecting and retaining device.

B. Another conventional embodiment is shown in FIG. 2, likewise, the rollers 10 are also used as a mold core, and then the spacer portion 13 is formed by injecting plastic directly on and between the surfaces of the rollers 10. Each of the spacer portions 13 is formed with a protruding connecting portion 131 (as disclosed in U.S. Pat. No. 6,390,678 B1) for cooperating with the rollers 10. This design is similar with the production technology of the first conventional product, and the difference between the two is the location of the protruding connecting portion 131. This conventional spacer also has the following disadvantages:

1, the spacer portion 13 of the protruding connecting portion 131 is formed directly between the rollers 10 by using the rollers 10 as mold core, the related production technology is very complicated. Furthermore, the size of the mold has to change according to different sizes (when the size is comparatively long, the mold will become large), the production complexity will be increased, and the resultant production cost will be relatively high.

2, the spacer portion 13 is formed directly between the rollers 10 by using the rollers 10 as mold core, it must apply release agent between the spacer portion 13 and the rollers 10 prior to the formation of the spacer portion 13, this also makes the production process more complicated and increases the production cost.

3, the protruding connecting portion 131 of the second conventional embodiment is located at the center of the side contacting the rolling surface of the rollers, accordingly, a special guiding groove must be made in the ball rolling groove of the sliding block for accommodation of the protruding connecting portion 131. Since making such a guiding groove is not easy, the production cost of this second conventional embodiment will still be high, moreover, the protruding connecting portion 131 may interfere with the rolling motion of the rollers.

4, the spacer portion 13 of this second conventional embodiment is also formed with two concave side surfaces for mating with the rollers 10, and the concave side surfaces of the spacer portion 13 has the same radius of curvature as the rollers 10. As a result, the spacer portion 13 will have a complete surface contact with the rollers 10, substantially increasing the friction resistance between the rollers and the spacer portion.

5, the radial direction of the rollers 10 is the most important loading direction, and the protruding connecting portion 131 of the second conventional embodiment is exactly located in the radial direction of the rollers 10, such arrangement will considerably reduce the rolling contact area of the rollers with respect to the groove of the sliding block, and as a result, the load capacity and the rigidity of the liner guideway will be substantially reduced.

Figure 3:
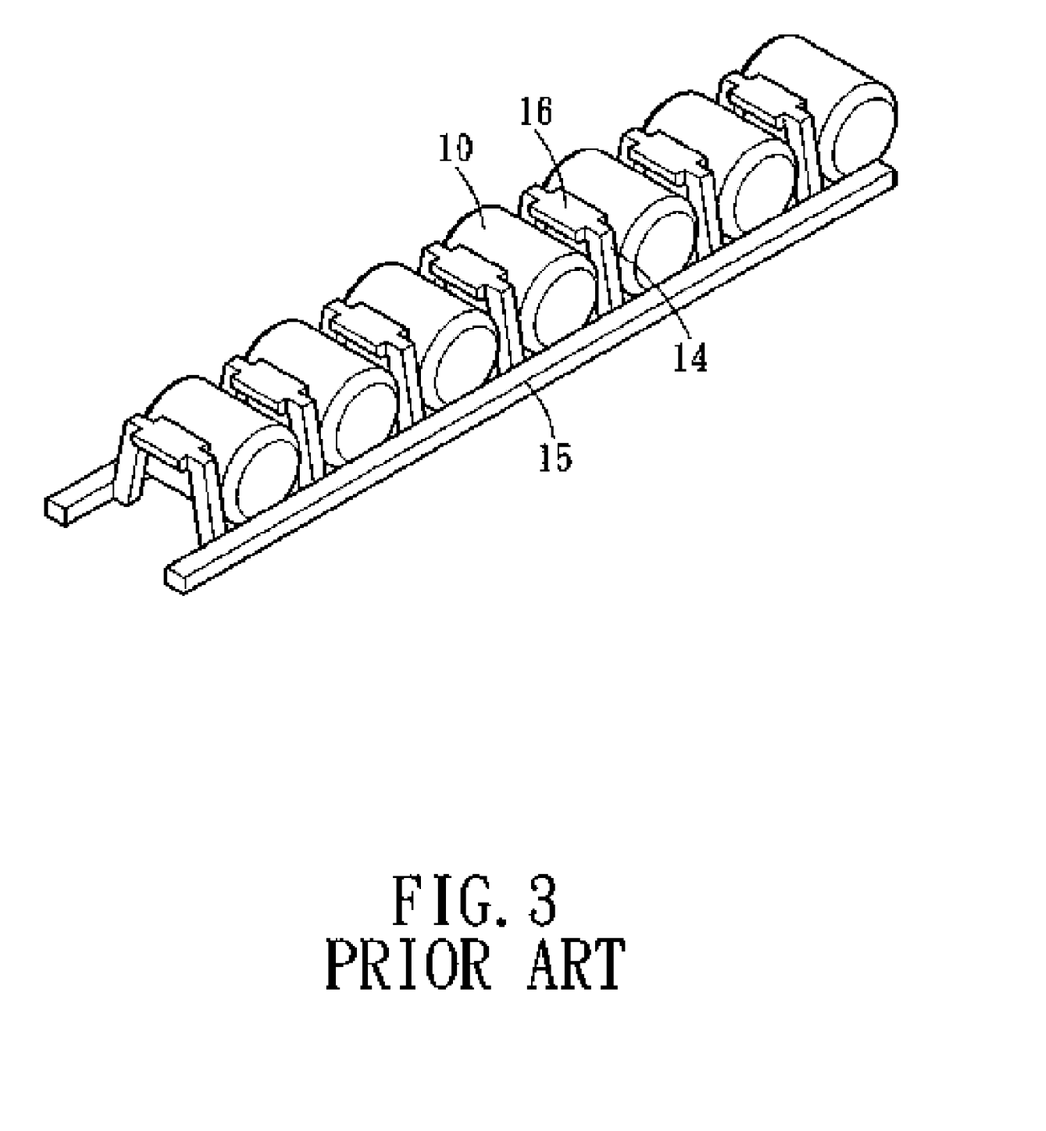
FIG. 3 is a perspective view of a third conventional roller connecting and retaining device.

C. Finally, please refer to FIG. 3, a third conventional embodiment is illustrated, wherein two connecting portion 15 is disposed at the contacting edge on both end surfaces of the rollers 10, and a plurality of slant supporting portions 14 obliquely extend inward. The slant supporting portions 14 are oppositely arranged in pairs and a spacer portion 16 is connected between each paired slant supporting portions 14. The spacer portion 16 is adapted to abut against the rolling surface of the rollers 10 (as disclosed in U.S. Pat. No. 2005/0152625 A1). This design also has the following disadvantages:

1, the two connecting portions 15 are mounted at the contacting edge on both end surfaces of the rollers 10, and the connecting portions 15 are flush with the connecting portion of the rollers 10, therefore, the connecting portions 15 of this third conventional embodiment will interfere with the contacting portion of the rolling surfaces at both sides of the rollers 10, and will create a resistance to the rolling of the rollers 10 (it is likely to form a contact friction).

2, furthermore, the slant supporting portions 14 of the third conventional embodiment are of obliquely extending type, the relatively short spacer portion 16 will only contact the mid portion of the rollers 10. Since the rollers 10 are only subjected to a retaining force from a single side, the spacer portion 16 will be likely to sway with the cooperation of the slant supporting portions 14, this only will cause the operation to be unstable.

It is understood from the conventional products described above that the roller system of the linear mechanism is still unable to maintain a stable operation. To solve the aforementioned problems, the inventor of this invention, on the basis of the accumulated experience and skills associated with the linear transmission field, develops a brand new roller connecting and retaining device that is a unitary structure suitable for mass production and can prevent the problems of the rollers, such as slant position, friction, impact and skip, ensuring that the linear guideway can operate smoothly.

SUMMARY OF THE INVENTION

The primary objective of the present invention is to provide a roller connecting and retaining device that is suitable for integral formation and fast mass production.

To achieve the abovementioned objective, the present invention is designed such that the retaining portions are oppositely arranged in pairs and connected vertically to the connecting portions, and a mold-releasing concave is formed in each conjunction between the spacer portion and the retaining portion, this design allows for easy injection molding of the connecting portions and the retaining portions, and facilitates mold opening. The length of the spacer portion corresponds to the length of the roller, and it is unnecessary to use the rollers as mold core. It truly is a brand new design suitable for integral formation, fast and mass production and assembly.

The secondary objective of the present invention is to provide a roller connecting and retaining device that allows for stable and smooth transmission.

To achieve the abovementioned objective, the retaining portions are oppositely arranged in pairs and connected vertically to the connecting portions. The spacer portions are connected between the upper end and the lower end of the paired opposite retaining portions. The upper and lower spacer portions are arranged oppositely in pairs and located between the neighboring rollers. The contacting edges are formed at both sides of the respective spacer portions and have a linear contact with the rolling surface of the rollers, and the contacting edges of the opposite spacer portions are located correspondingly to the axial center of the rollers and are arranged at both sides of the inactive contact surface of the rollers. The contacting edge of the upper and lower spacer portions can press against the rollers more stably, forcing the rollers to be arranged evenly and preventing the problems of the rollers, such as slant position, friction, impact and skip. Furthermore, the contacting edges of the opposite spacer portions are located correspondingly to the axial center of the rollers and are arranged at both sides of the inactive contact surface of the rollers, such arrangements ensure that the linear guideway can operate smoothly.

Yet another objective of the present invention is to provide a roller connecting and retaining device that can store lubricant.

Every two spacer portions and two retaining portions define a hollow rectangular frame, the spacer portions can produce a clearance between two neighboring rollers, preventing the rolling surfaces of the rollers from contact each other, furthermore, lubricant also can be stored in the rectangular frame.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 4:
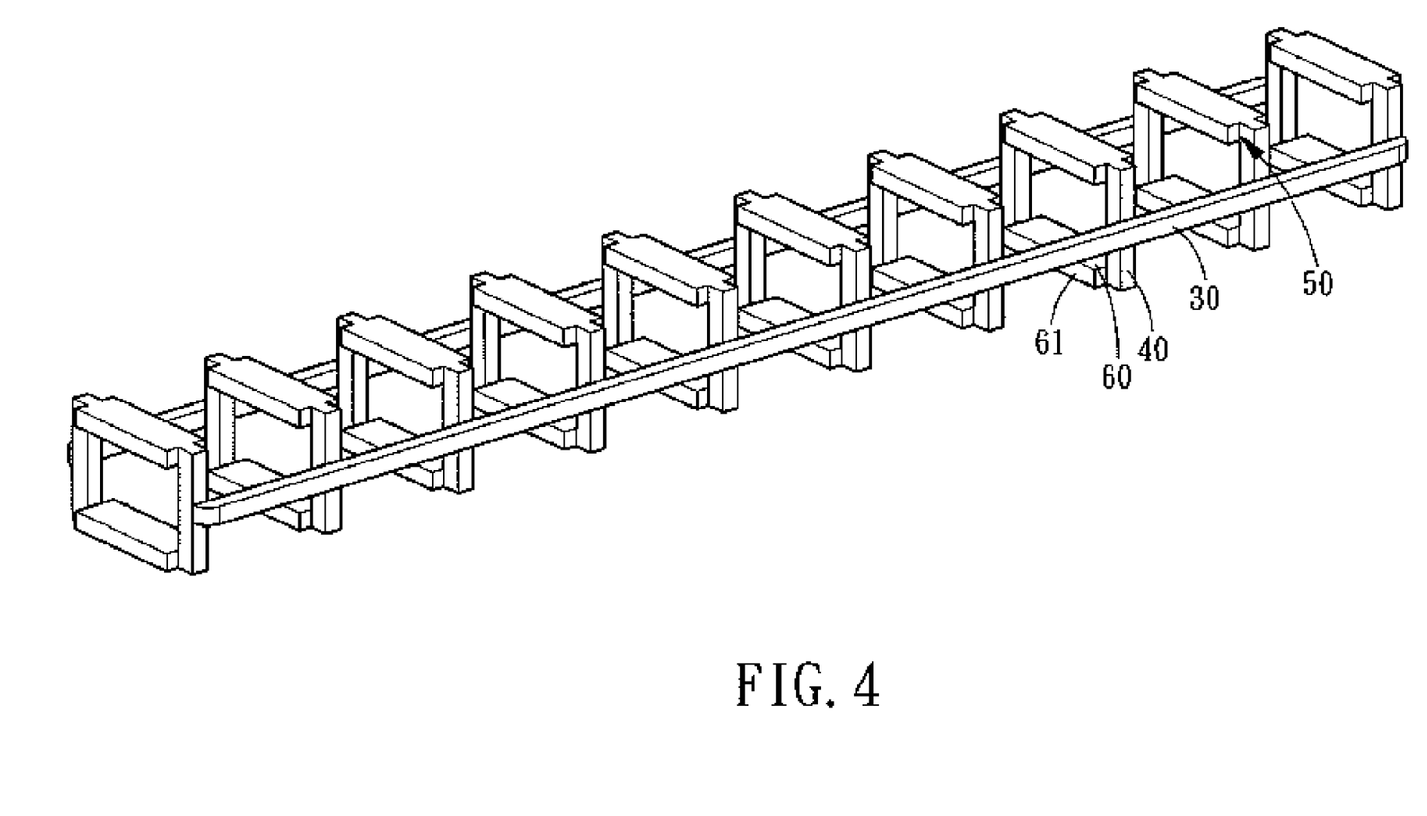
FIG. 4 is a perspective view of a roller connecting and retaining device in accordance with the present invention.
Figure 6:
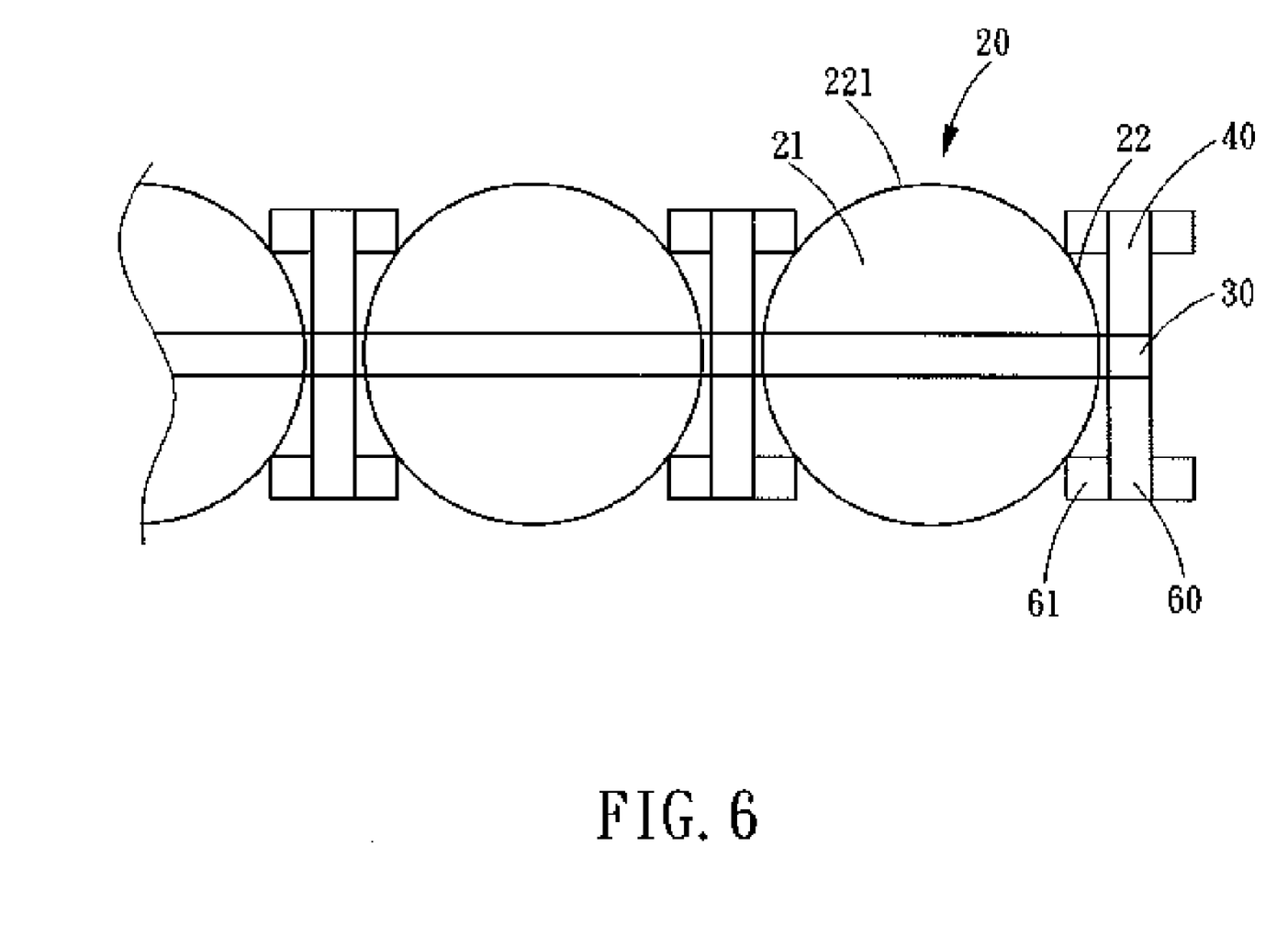
FIG. 6 is a side view of the roller connecting and retaining device in accordance with the present invention.

The foregoing, and additional objects, features and advantages of the present invention will become apparent from the following detailed description of preferred embodiment thereof, taken in conjunction with the accompanying FIGS. 4 and 6.

The roller connecting and retaining device in accordance with the present invention is mounted on a plurality of rollers 20 and circulates in the roller rolling passage of the linear system. The rolling connecting and retaining device comprises two connecting portions 30, a plurality of retaining portions 40, and a plurality of spacer portions 60.

The connecting portions 30 are mounted at both end surfaces 21 of the rollers 20 and approximately located an equal distance from the two contacting portions 221 of the rolling surfaces 22 of the rollers 20. In fact, it will be ok if the connecting portion of the present invention is maintained between the two contacting portions 221 of the rolling surfaces 22 of the rollers 20.

The retaining portions 40 are oppositely arranged in pairs and connected vertically to the connecting portions 30.

The spacer portions 60 are connected between the upper end and the lower end of the paired opposite retaining portions 40. The upper and lower spacer portions 60 are arranged oppositely in pairs and located between the neighboring rollers 20. Two contacting edges 61 are formed at both sides of the respective spacer portions 60 and have a linear contact with the rolling surface 22 of the rollers 20, and the contacting edges 61 of the opposite spacer portions 60 are located correspondingly to the axial center of the rollers 20, that is, the contacting edges 61 of the opposite spacer portions 60 are parallel to the axial center of the rollers 20 for facilitating the rolling of the rollers 20. The upper and lower spacer portions 60 are located at both sides of the upper and lower contacting portions 221 of the rollers 20. A mold-releasing concave 50 is formed in each conjunction between the spacer portion 60 and the retaining portion 40. Every two spacer portions 60 and two retaining portions 40 define a hollow rectangular frame adapted to retain the rolling surface 22 of the rollers 20 and restore lubricant.

Figure 5:
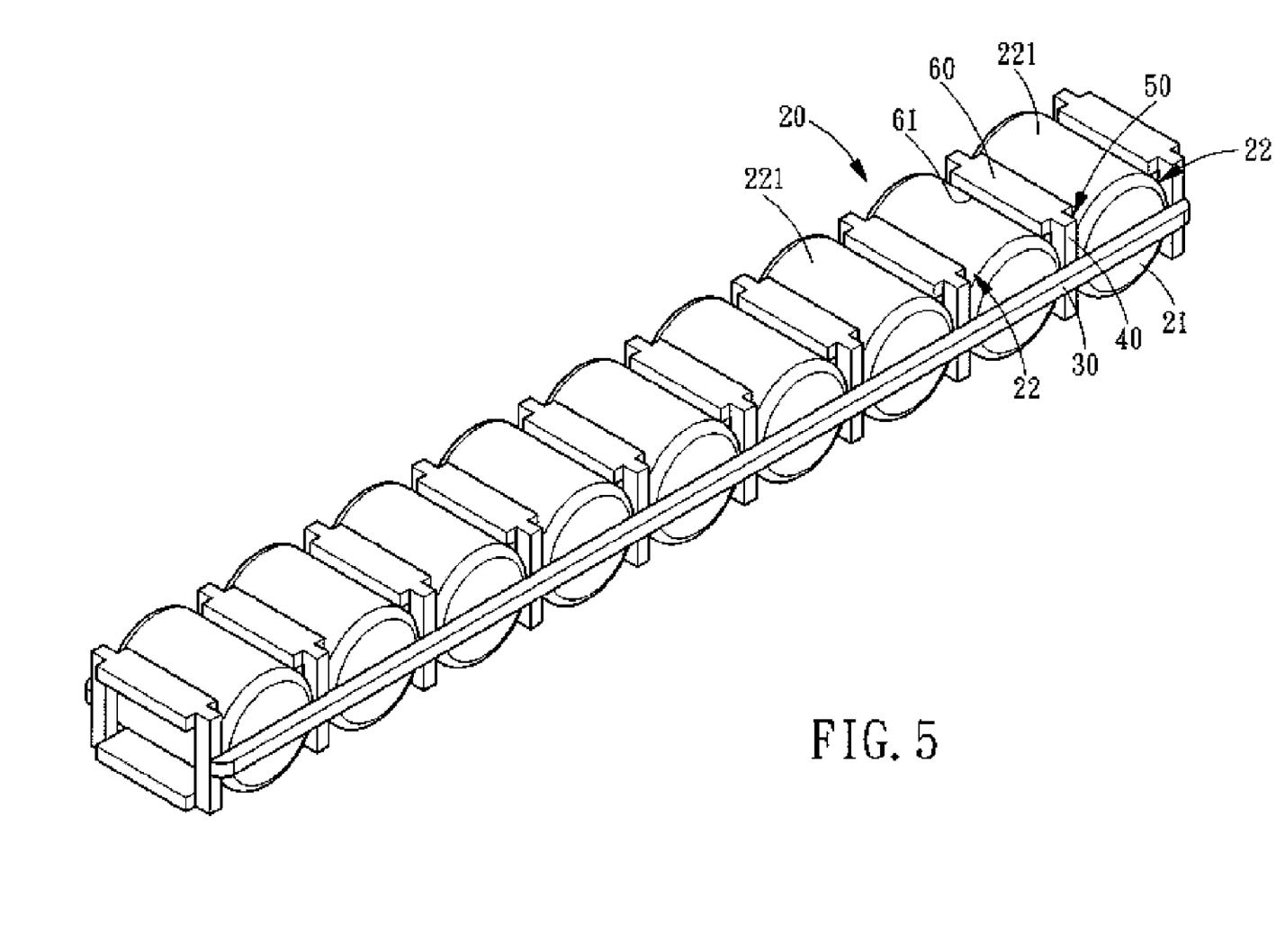
FIG. 5 is a perspective view in accordance with the present invention of showing the roller connecting and retaining device filled with rollers.

For a better understanding of the embodiment, its operation and function, reference should be made particularly to FIGS. 5 and 6.

The spacer portions 60 are connected between the upper end and the lower end of the paired opposite retaining portions 40, and the spacer portions 60 at the upper and lower ends of the retaining portions 40 are arranged oppositely in pairs and located between the neighboring rollers 20, such arrangements contribute to the stable operation of the roller 20.

In addition, the respective spacer portions 60 has two contacting edges 61 at both sides thereof that maintain a linear contact with the rolling surface 22 of the rollers 20, and the contacting edges 61 of the opposite spacer portions 60 are located correspondingly to the axial center of the rollers 20. Hence, the friction between the spacer portions 60 and the rollers 20 at both sides thereof is not great.

It will be noted that the spacer portions 60 at the upper and lower ends of the contacting portions 221 of the rollers 20 can effectively stabilize the operation of the rollers 20, ensuring that the roller connecting and retaining device can contribute to the stable and smooth transmission of the linear mechanism, and preventing the neighboring rollers 20 from impacting each other. Moreover, the rectangular frame formed by the spacer portions 60 and the retaining portions 40 not only can store lubricant but also can strengthen the structural strength of the retaining portions 40 and the spacer portions 60, preventing the rollers from swaying during operation, and thus reducing vibration, resistance and noise generated during operation.

Figure 7:
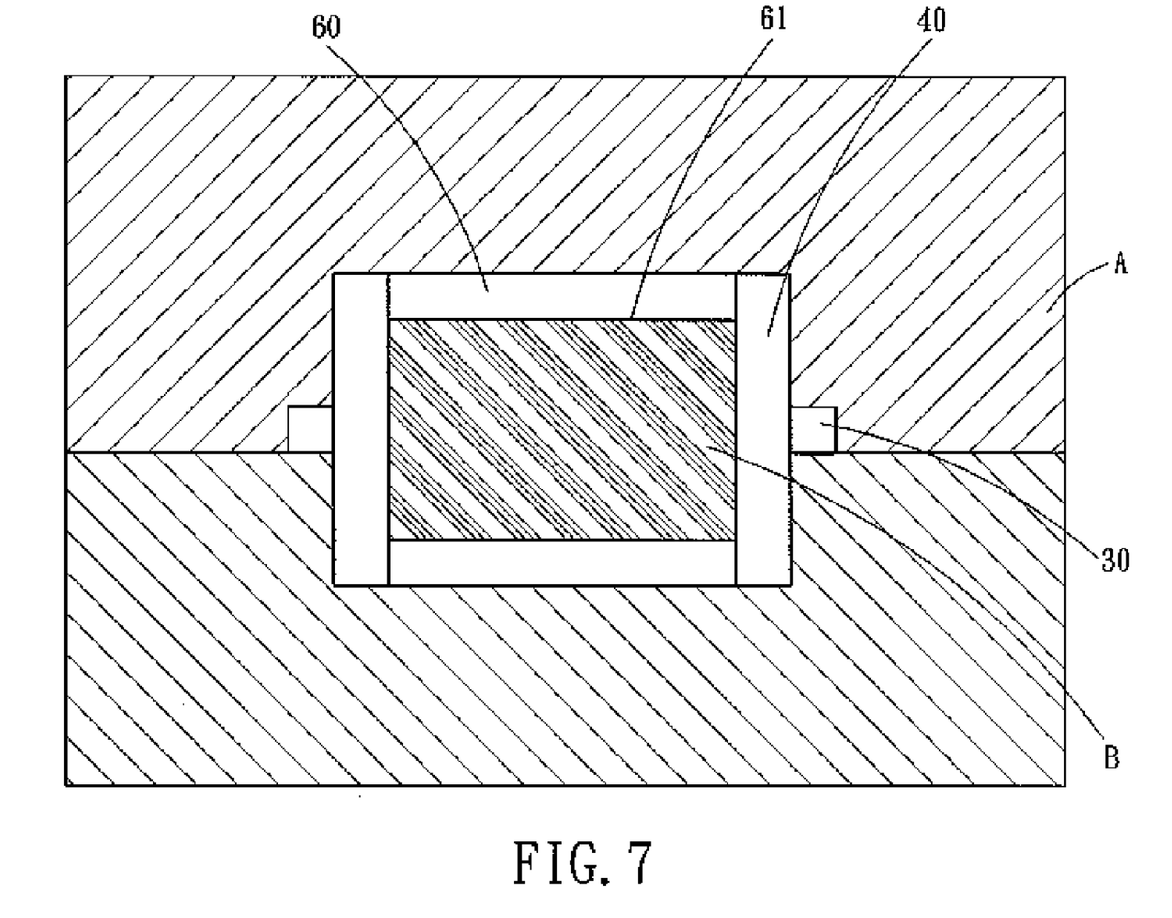
FIG. 7 is a cross sectional illustrative view in accordance with the present invention of showing the injection molding of the roller connecting and retaining device.

On the other hand, as shown in FIG. 7, a mold-releasing concave 50 is formed in each conjunction between the spacer portion 60 and the retaining portion 40, and the connecting portion 30, the retaining portion 40 and the spacer portions 60 are connected vertically or horizontally to one another, and with the cooperation of the mold-releasing concave 50, the mold A can be released very easily. The roller connecting and retaining device of the present invention has the hollow structure for stabilizing the rollers 20, and unlike the conventional method that the rollers should be implanted in advance, the hollow structure of the present invention can be formed very easily by putting a block B in the mold A and then pulling it out.

Hence, the roller connecting and retaining device of the present invention very facilitates injection molding process and mold opening, its structural design will not cause any production troubles. In addition, not only the retaining portions and the connection portions are suitable for injection molding and mold opening, but also the length of the spacer portion corresponds to the length of the roller, and it is unnecessary to use the rollers as mold core. It truly is a brand new design suitable for integral formation, fast and mass production and assembly.

It is to be noted again that the connecting portions 30 are arranged at both end surfaces 21 of the rollers 20 and are approximately located an equal distance from the two contacting portions 221 of the rolling surfaces 22 of the rollers 20 (the connecting portions can be located between the two contacting portions 221 of the rolling surfaces 22 of the rollers 20). Therefore, unlike the conventional method that the guiding groove for guiding the connecting portion should be defined in the roller rolling groove or a guiding groove should be defined for mating with the roller's rolling surface, the guiding groove of the present invention can be defined directly at the most easily processed position, in the edge of the roller rolling groove (the position of the mold parting line). In this way, the mold of the present invention can be prevented from being subjected to complicated machining, thus simplifying the production process.

With the cooperation of the aforesaid connecting portions 30, the retaining portions 40 and the spacer portions 60, the present invention will have the following advantages:

1, forcing the rollers to be arranged evenly and preventing the problems of the rollers, such as slant position, friction, impact and skip, ensuring that the linear guideway can operate smoothly.

2, more stably guiding and separating the respective rollers, preventing the friction and impact being caused between the neighboring rollers, substantially reducing the noise level.

3, the roller connecting and retaining device of the present invention very facilitates injection molding process and mold opening, it can be produced in mass quantity by using the general plastic injection molding technology.

To summarize, the innovated structural design of the present invention includes the connecting portions, the retaining portions and the spacer portions. The retaining portions are oppositely arranged in pairs and connected vertically to the connecting portions. The spacer portions are connected between the upper end and the lower end of the paired opposite retaining portions. The upper and lower spacer portions are arranged oppositely in pairs and located between the neighboring rollers. Two contacting edges are formed at both sides of the respective spacer portions and have a linear contact with the rolling surface of the rollers, and the contacting edges of the opposite spacer portions are located correspondingly to the axial center of the rollers and are arranged at both sides of the inactive contact surface of the rollers. A mold-releasing concave is formed in each conjunction between the spacer portion and the retaining portion. The design of the present invention facilitates injection molding process, mold opening, and mass production. The contacting edge of the opposite spacer portions can prevent the problems of the rollers during rolling motion, such as slant position, friction, impact and skip.

While we have shown and described various embodiments in accordance with the present invention, it should be clear to those skilled in the art that further embodiments may be made without departing from the scope of the present invention.

What is claimed is:

1. A roller connecting and retaining device adapted to be mounted on a plurality of rollers in a linear system, comprising connecting portions, a plurality of retaining portions and spacer portions, characterized in that:

the connecting portions are mounted at both end surfaces of the plurality of rollers;

the retaining portions are oppositely arranged in pairs and connected vertically to the connecting portions;

the spacer portions are connected between an upper end and a lower end of two opposite retaining portions, the spacer portions at the upper and lower ends of the opposite retaining portions are arranged oppositely in pairs to define a hollow rectangular frame and located between two neighboring rollers, a contacting edge is formed at either of the respective spacer portions and has a linear contact with a rolling surface of the rollers, a mold-releasing concave is formed in each conjunction between the spacer portions and the retaining portions.

2. The roller connecting and retaining device as claimed in claim 1, wherein the connecting portions are located between two contacting portions of the rolling surface of the rollers.

3. The roller connecting and retaining device as claimed in claim 2, wherein the contacting edges of the opposite spacer portions are located parallel to an axial center of the rollers, and the spacer portions at the upper and lower ends of the opposite retaining portions are located at both sides of upper and lower contacting portions of the rollers.

4. The roller connecting and retaining device as claimed in claim 2, wherein the connecting portions are approximately located an equal distance from the two contacting portions of the rolling surfaces of the rollers.

5. The roller connecting and retaining device as claimed in claim 1, wherein the contacting edges of the opposite spacer portions are located correspondingly to an axial center of the rollers, and the spacer portions at the upper and lower ends of the opposite retaining portions are located at both sides of upper and lower contacting portions of the rollers.

* * * * *